United States Patent
Miyata

[11] Patent Number: 6,113,251
[45] Date of Patent: Sep. 5, 2000

[54] TRANSMISSION SCREEN SYSTEM

[75] Inventor: Hideki Miyata, Shinjuku-Ku, Japan

[73] Assignee: Dai Nippon Printing Co., Ltd., Japan

[21] Appl. No.: 09/160,137

[22] Filed: Sep. 25, 1998

[30] Foreign Application Priority Data

Sep. 29, 1997 [JP] Japan ................................ 9-263511

[51] Int. Cl.$^7$ .................................................. F21V 5/00
[52] U.S. Cl. ........................... 362/333; 359/457; 359/456
[58] Field of Search .................................. 362/335, 334, 362/333, 332, 336, 331, 268; 359/455, 456, 457

[56] References Cited

U.S. PATENT DOCUMENTS

| | | | |
|---|---|---|---|
| 4,509,822 | 4/1985 | Clausen | 359/456 |
| 5,005,945 | 4/1991 | Van de Ven | 359/456 |
| 5,661,600 | 8/1997 | Mitani | 359/457 |
| 5,751,478 | 5/1998 | Yoshimura | 359/453 |
| 5,914,809 | 6/1999 | Mitani | 359/457 |
| 5,959,701 | 9/1999 | Watanabe | 348/744 |

*Primary Examiner*—Sandra O'Shea
*Assistant Examiner*—Hargobind S. Sawhney
*Attorney, Agent, or Firm*—Parkhurst & Wendel, L.L.P

[57] ABSTRACT

A transmission screen including a lenticular lens sheet having glass beads, having lenticular lenses, and a Fresnel lens sheet. Light is projected on the transmission screen by a projector, and an image made up of a large number of picture elements is thus projected onto the lenticular lens sheet. When the picture element pitch of the picture elements is designated by P, the arrangement pitch r of the lenticular lenses of the lenticular lens sheet is designated by r, and the particle diameter of the glass beads is designated by d, these P, r and d fulfill the following conditions: $r/P \leq 1/4.0$ and $1.0 \mu m \leq d$.

8 Claims, 6 Drawing Sheets

TRANSMISSION SCREEN SYSTEM

TECHNICAL FIELD

The present invention relates to a transmission screen system comprising a transmission screen, and a projector for projecting light on the transmission screen.

BACKGROUND ART

As a transmission screen in a transmission screen system, a lenticular lens sheet made from a synthetic resin to material such as polymethylmethacrylate has conventionally been used either singly or in combination with another lens sheet. Imaging light is projected on such a transmission screen by a projector having a light source such as a CRT, and an image thus produced is observed.

In recent years, a projection tube having a light bulb whose projection aperture is small, such as an LCD, DMD, ILA or the like came to be used instead of the projector using a CRT.

When such a projection tube having a light bulb whose projection aperture is small is used for projecting an image onto the conventional transmission screen, the image suffers from glaring called scintillation or speckle.

As a means for solving this problem, there have been known a method in which the surface of the transmission screen is scanned by a laser light source; a method in which the transmission screen is vibrated; and a method in which a large amount of a diffusing agent is incorporated into the transmission screen.

However, in the above-described conventional techniques, it is necessary to modify the projector, or to provide an additional apparatus to the projector. Moreover, when a large amount of diffusing agent is incorporated into the transmission screen, an image projected on such a transmission screen undergoes decrease in gain, and unfavorable lowering of resolution.

CONSTITUTION OF THE INVENTION

An object of the present invention is to provide a transmission screen system capable of producing an image on its transmission screen with effectively preventing the image from glaring, without causing lowering of gain and decrease in resolution even when a projector having a light bulb whose projection aperture is small is used without providing any additional apparatus to this projector.

The present invention is a transmission screen system comprising a transmission screen having various diffusing elements, and a projector for projecting light on the transmission screen to project thereon an image made up of a large number of picture elements, in which, when the size of the maximum diffusing element of the transmission screen is designated by r, the size of the minimum diffusing element of the transmission screen is designated by d, and the picture element pitch on the transmission screen is designated by P, these r, d and P fulfill the following conditions: $r/P \leq 1/4.0$ and $1 \mu m \leq d$.

Further, it is preferable that the transmission screen be composed of a Fresnel lens sheet provided on the light-entering side of the transmission screen, and a lenticular lens sheet containing a large number of lenticular lenses, provided on the light-emerging side of the transmission screen, that the maximum diffusing element be the lenticular lenses contained in the lenticular lens sheet and that the size of the maximum diffusing element be the arrangement pitch of the lenticular lenses.

It is preferable that a large number of light-diffusive fine particles be contained in the lenticular lens sheet, that the minimum diffusing element be the light-diffusive fine particles and that the size of the minimum diffusing element be the mean particle diameter of the light-diffusive fine particles.

It is preferable that the light-diffusive fine particles be glass beads.

EMBODIMENTS OF THE PRESENT INVENTION

Figure 1A:
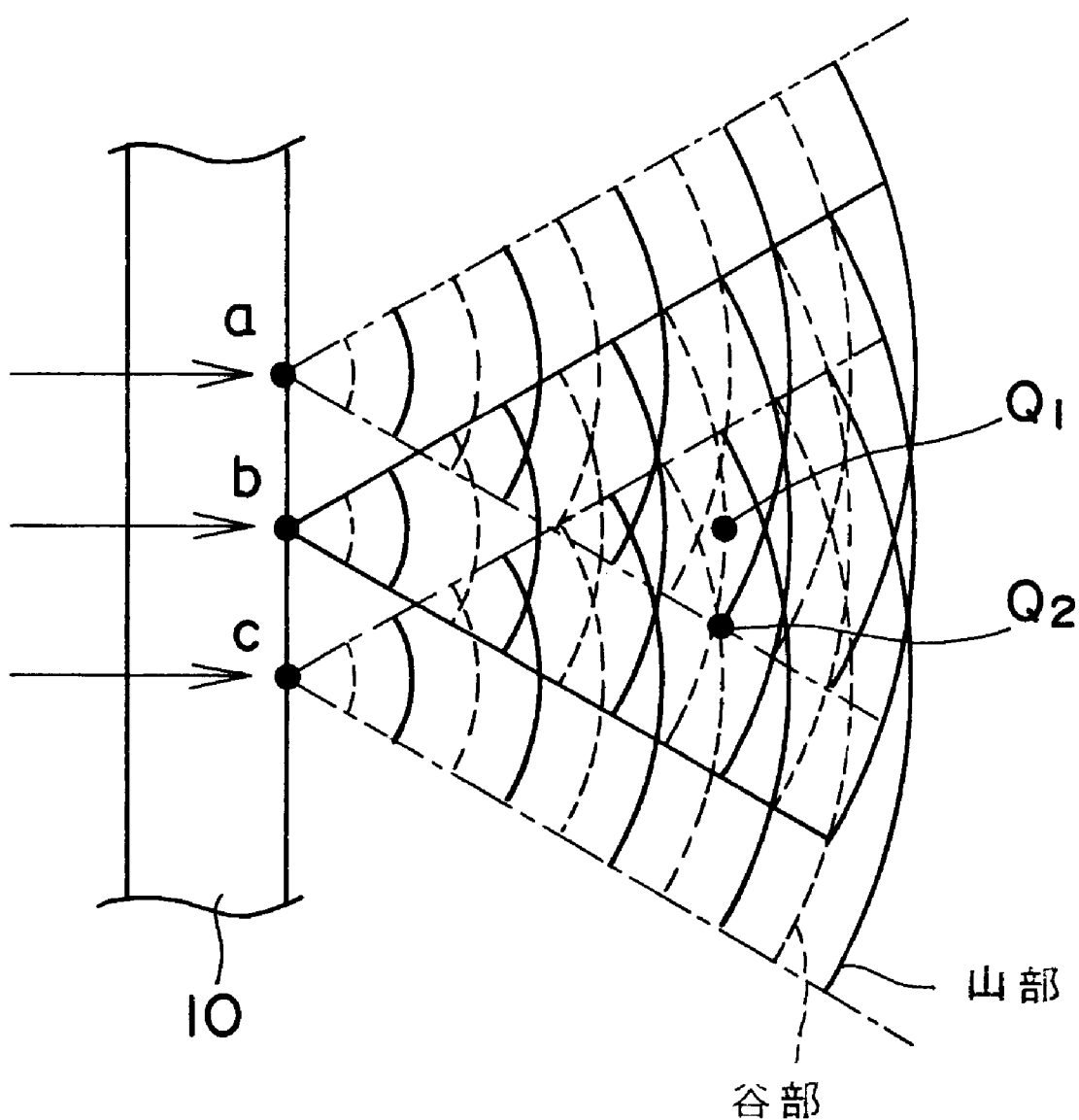
FIG. 1(A) is a view for illustrating the cause of occurrence of glaring of an image.

By referring to FIGS. 1(A) to 1(E), glaring that is caused on an image produced on a transmission screen by projecting thereon light by a projector will firstly be described. FIG. 1(A) is a view illustrating the interference of light. In FIG. 1(A), light rays from a projector are projected on a transmission screen, for example, a lenticular lens sheet 10 as coherent rays because the diameter of the aperture of the projection lens of the projector is smaller than that of a conventional projector using a CRT. These rays are diffracted by diffusing elements in the lenticular lens sheet 10, and become the sources a, b and c of secondary waves having the same phase. In FIG. 1(A), although three secondary wave sources are shown for explanation, a larger number of secondary wave sources exist in reality. Further, in FIG. 1(A), the distance between the secondary wave sources a and b, or b and c is shown as being greater than the distance between observation points Q1 and Q2 for convenience; however, the practical distance between the secondary wave sources a and b, or b and c is so small that they are recognized as one point on the lenticular lens sheet 10.

In FIG. 1(A), light rays from the secondary wave sources a, b and c are waves having the same phase, so that the wave crests and wave troughs of the rays from the secondary wave sources are shown by solid lines and broken lines, respectively.

Figure 1B:
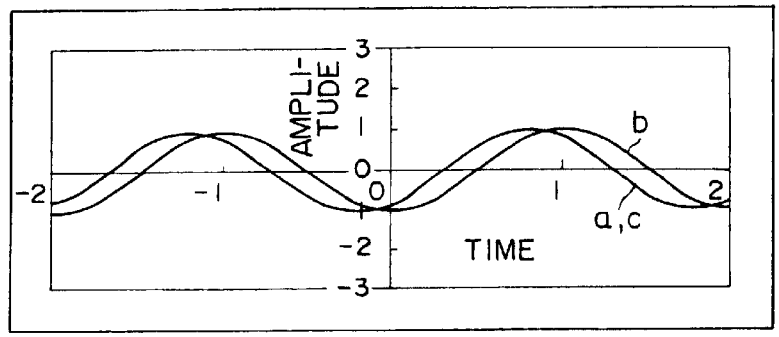
FIG. 1(B) is a graph showing the amplitudes of rays from secondary wave sources.

FIG. 1(B) is a graph showing the phases of the rays from the secondary wave sources a, b and c at the observation point Q1 shown in FIG. 1(A). In FIG. 1(B), the abscissa is an axis for time, and the center of the abscissa corresponds to the "present time" in FIG. 1(A). Further, in FIG. 1(B), the ordinate shows the amplitude of light; and the amplitudes of the rays from the secondary wave sources a, b and c are taken as 1 for convenience.

Figure 1C:
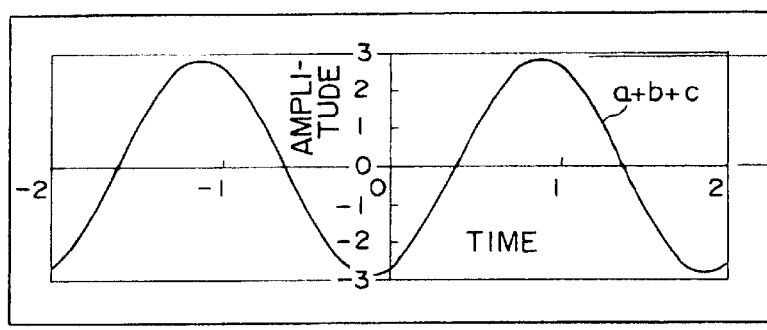
FIG. 1(C) is a graph showing the amplitude of composite light.

FIG. 1(C) is a graph showing light that is obtained by composing the rays from the secondary wave sources a, b and c in FIG. 1(B) (by superposing the waves) and which is practically observed at the observation point Q1. In general, the frequency of the wave of visible light is $10^{14}$ Hz, so that we cannot recognize the glimmering of the light but can perceive only the amplitude of the light.

Figure 1D:
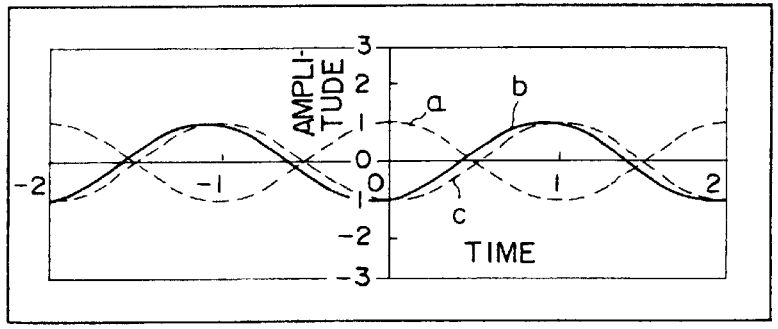
FIG. 1(D) is a graph showing the amplitudes of rays from secondary wave sources.
Figure 1E:
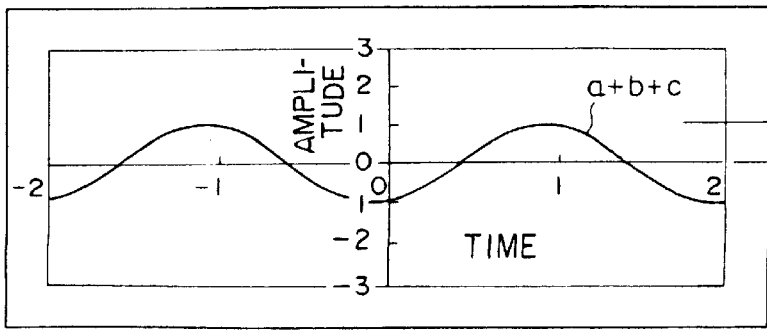
FIG. 1(E) is a graph showing the amplitude of composite light.

FIG. 1(D) and FIG. 1(E) are graphs showing the rays from the secondary wave sources a, b and c at the observation point Q2, and light obtained by composing these rays.

As shown in FIGS. 1(A) to 1(E), the amplitude of composite wave of light is great at the observation point Q1, so that the image can be seen strongly (brightly) when it is observed at the observation point Q1. On the other hand, the amplitude of composite wave is small at the observation point Q2, so that the image on the same part of the lenticular lens sheet 10 as in the case of the above appears dark when it is observed at the observation point Q2.

Thus, due to the interference of light, a certain part on the lenticular lens sheet 10 is seen brightly or darkly depending upon the position of an observer independently of the original image which is projected by a projector. On the contrary, various parts on the lenticular lens sheet 10 are also seen brightly or darkly depending on their positions even when they are seen by an observer from one position. This phenomenon is called scintillation. By this phenomenon, grainy brightness/darkness is caused independently of the original image, so that the quality of the projected image is remarkably lowered.

As such, according to the present invention, the phases of light rays which enter into any observation point from various points on the lenticular lens sheet 10 of the transmission screen are made remarkably ununiform, thereby equalizing the intensities of the interfered rays observed at every observation point.

To attain the above, as will be described later, a change in the phase of imaging light to be caused by reflection or refraction is achieved by the use of a diffusing agent incorporated into the lenticular lens sheet 10, or diffusing elements in the lenticular lens sheet 10 such as the embossed surface thereof or lenses contained therein.

However, when the phases of rays that enter into any observation point are simply made ununiform to diffuse the imaging light, the resolution is lowered. This case is the same as the case where a large amount of a diffusing agent is added to the lenticular lens sheet 10 as mentioned in the BACKGROUND ART; and the gain is decreased, and the projected image becomes very dark.

We noticed that, in order to make the phases of imaging light rays ununiform with high efficiency, it is desirable to convert rays which emerge from each aperture of a projector having a light bulb into waves of various phases by means of diffusion, thereby allowing them to interfere with rays emerging from other apertures. Specifically, we found that glaring which is caused on an image projected onto the lenticular lens sheet 10 of the transmission screen is drastically reduced when the size of the maximum diffusing element relative to the picture element pitch (pixel pitch) is made smaller than a predetermined value as will be described hereinafter. The present invention was accomplished on the basis of this finding.

When the size of the diffusing element is made greater with respect to the pixel pitch, the number of times that rays pass through the diffusing agent is decreased. Consequently, the degree of a change in phase is lowered, and ununiformity of the intensities of interfered light remains. In this case, in order to increase the number of times rays pass through the diffusing agent contained in the lenticular lens sheet 10, it is necessary to increase the amount of the diffusing agent to be added. As a result, the projected image becomes dark.

On the contrary, when the size of the diffusing element is made smaller with respect to the pixel pitch, the number of the diffusing elements becomes large as compared with the case where the diffusing element is large. As a result, the number of times that rays are refracted or reflected is increased, and the degree of turbulence of phases becomes high.

Figure 2A:
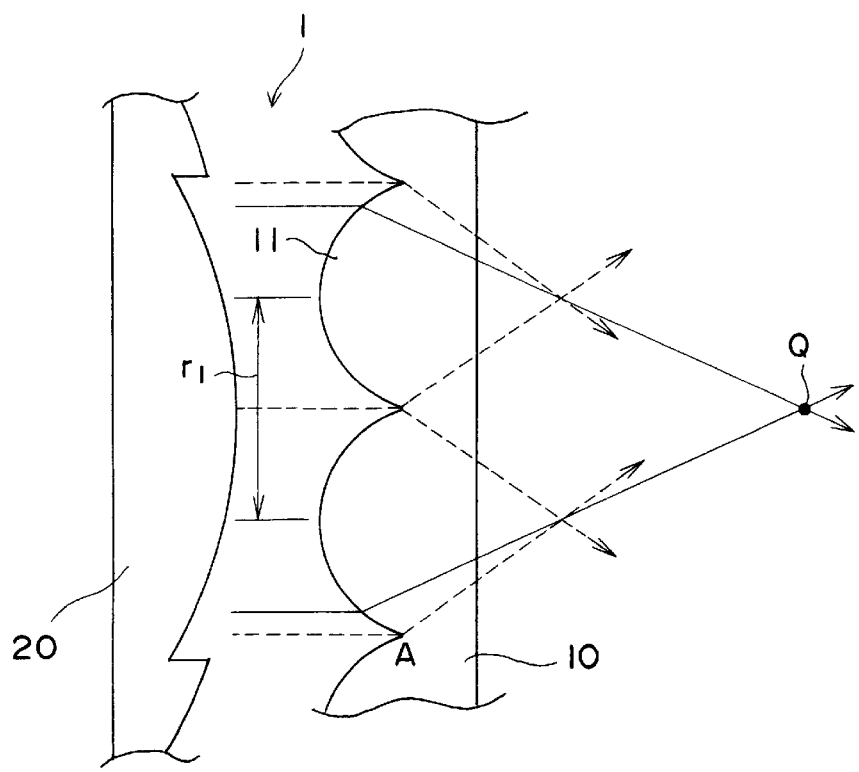
FIG. 2(A) is a view showing a conventional transmission screen system.
Figure 2B:
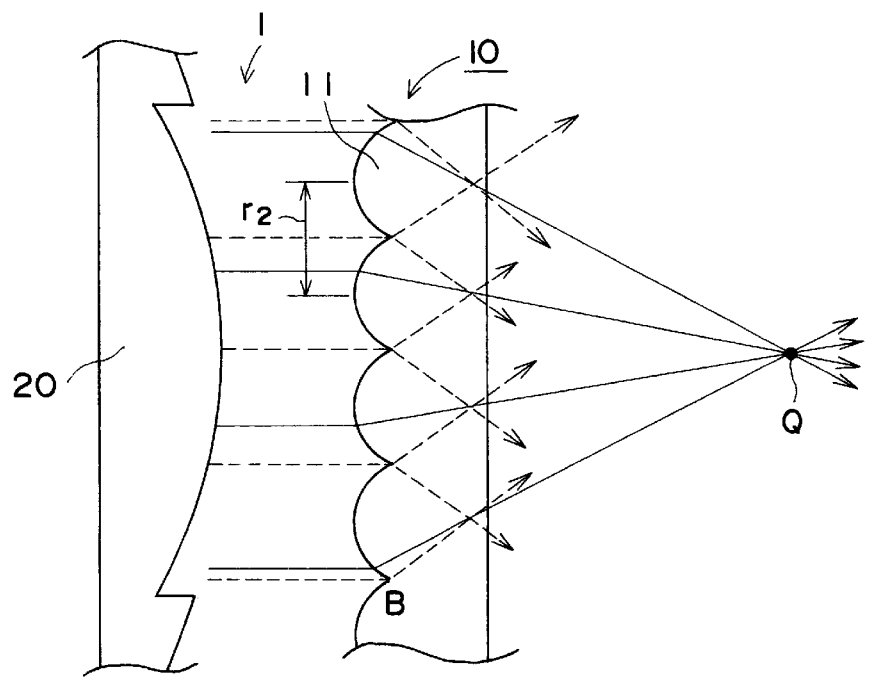
FIG. 2(B) is a view showing a transmission screen system according to the present invention.

FIGS. 2(A) and 2(B) are views showing a transmission screen system according to the present invention by comparing it with a conventional one, where FIG. 2(A) shows a conventional transmission screen system, and FIG. 2(B) shows a transmission screen system according to the present invention.

As shown in FIG. 2(B), the transmission screen system comprises a Fresnel lens sheet 20 provided on the light-entering side, and a lenticular lens sheet 10 having a large number of lenticular lenses 11, provided on the light-emerging side; and a transmission screen 1 is composed of the Fresnel lens sheet 20 and the lenticular lens sheet 10. Further, light projected by an LCD projector 30 having a light drive is allowed to transmit through the Fresnel lens sheet 20 of the transmission screen 1 (FIGS. 3 to 8), whereby an image made up of a large number of picture elements with a predetermined picture element pitch (pixel pitch) is projected on the lenticular lens sheet 10 of the transmission screen 1.

The transmission screen 1 contains various diffusing elements, for example, the lenticular lenses 11 of the lenticular lens sheet 10.

The following was found: in the case where the diffusing property given by the lenticular lenses 11 of the lenticular lens sheet 10 according to the present invention is identical with that given by the lenticular lenses 11 of the conventional lenticular lens sheet 10, the number of directions from which rays enter into observation point Q is increased when the arrangement pitch of the lenticular lenses 11 is made smaller as shown in FIGS. 2(A) and 2(B), and the degree of turbulence of phases at the observation point Q thus becomes high, provided that the distance between the observation point Q and the lenticular lenses in FIG. 2(A) is the same as that in FIG. 2(B).

Namely, the arrangement pitch $r_2$ of the lenticular lenses 11 of the present invention is smaller than the arrangement pitch $r_1$ of the conventional lenticular lenses 11, the relationship of these two pitches being $r_2 < r_1$.

For this reason, in the case of the present invention where the arrangement pitch $r_2$ of the lenticular lenses 11 is smaller, the degree of turbulence of phases at the observation point Q is higher.

Further, it was found that since the diffusion efficiency of the lenticular lenses 11 is higher than that of light-diffusive fine particles such as glass beads 13 which will be described later, the lenticular lenses 11 can make the degree of turbulence of phases high, and, as a result, the effect of reducing scintillation is greatly increased.

We obtained the optimum size of each diffusing element from experiments, and found that, when the size r of the maximum diffusing element which is the greatest diffusing element constituting the transmission screen 1 is made not more than 1/4.0 of the picture element pitch (pixel pitch) P of picture elements on the lenticular lens sheet 10, glaring of an image projected on the lenticular lens sheet 10 is drastically reduced. As the maximum diffusing element, the lenticular lenses 11 of the lenticular lens sheet 10 can, for example, be adapted to have the size r of the maximum diffusing element which in this case is the arrangement pitch of the lenticular lenses 11.

Further, the following was also found: when the size d of the minimum diffusing element which is the smallest diffusing element constituting the transmission screen 1 is made smaller than 1 μm, transmitted light is colored due to interference (herein after called yellowing), and color reproductivity is decreased although no glaring is caused; as a result, the image quality is lowered. As the minimum diffusing element, light-diffusive fine particles such as glass beads 13 contained in the lenticular lens sheet 10 can, for example, be use; the size d of the minimum diffusing element in this case is the particle diameter of the glass beads 13.

The lenticular lens sheet 10 and the Fresnel lens sheet 20 are formed by using a synthetic resin such as polymethylmethacrylate, polycarbonate or polystyrene.

Furthermore, besides the lenticular lenses 11 of the lenticular lens sheet 10, having the function of diffusing light either horizontally or vertically as mentioned above, fly eye lenses, and the irregular surface of a sheet that has been subjected to an embossing treatment can be contemplated as the diffusing elements. Moreover, besides the glass beads 13, light-diffusive fine particles of inorganic substances such as amorphous silica, lithium fluoride and aluminum hydroxide, and light-diffusive fine particles of organic substances such as organic polymers, for example, acryl and styrene, and acryl-styrene copolymers may suitably be used as the light-diffusive fine particles.

In these diffusing elements, the size of the greatest diffusing element (maximum diffusing element) is designated by r, and that of the smallest diffusing element (minimum diffusing element) is designated by d. In particular, besides lenses having the function of diffusing light either horizontally or vertically, such as the lenticular lenses 11 and fly eye lenses, an irregular surface such as an embossed surface may suitably be used as the maximum diffusing element. In this case, the size r of the maximum diffusing element is the arrangement pitch of the lenses, or the pitch of the irregularities.

By referring now to FIGS. 3 to 8, specific examples will be illustrated.

EXAMPLE 1

Figure 3:
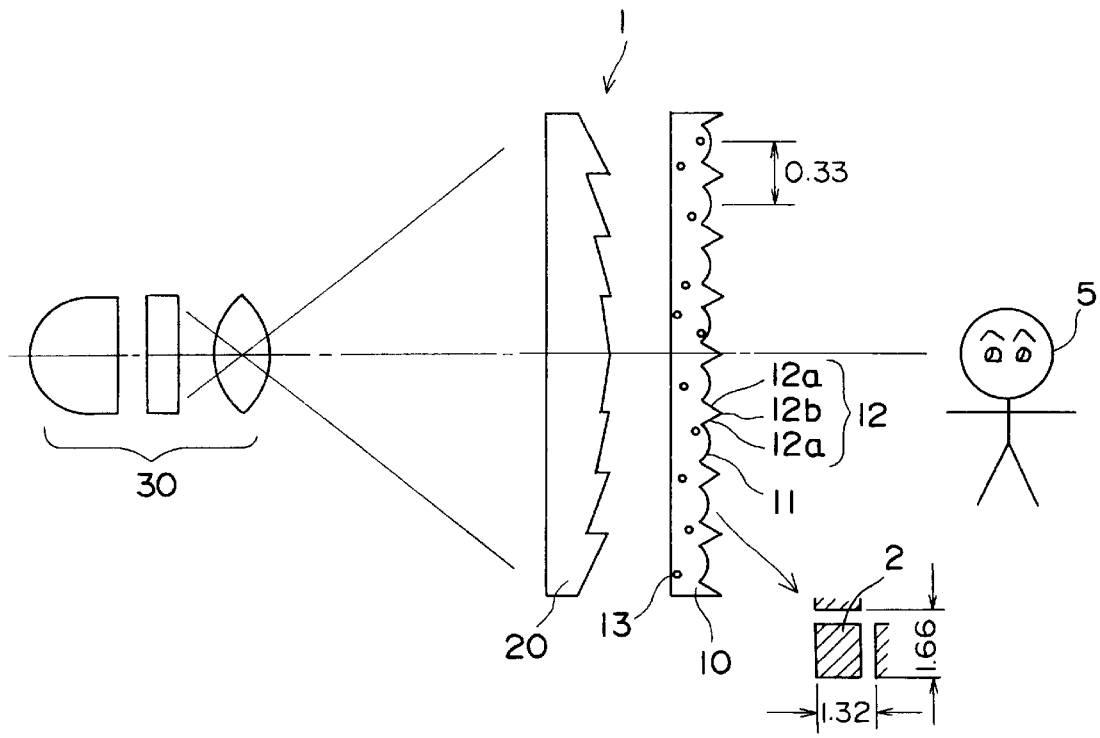
FIG. 3 is a view showing a transmission screen system of Example 1 according to the present invention.

A methyl methacrylate (MMA) syrup having a refractive index n of 1.49, containing glass beads 13 having a refractive index n of 1.53 and a mean particle diameter of 17 μm was cast-molded as shown in FIG. 3. Thus, total reflection lenses 12, each consisting of a pair of total reflection surfaces 12a, 12a and an apex 12b combining these surfaces, and lenticular lenses 11, each positioned next to each total reflection lens 12 were formed on the light-emerging surface (observation surface) of the molded sheet to obtain a wide-viewing-angle lenticular lens sheet 10 (WA lenticular lens sheet) as disclosed in Japanese Laid-Open Patent No. 501278/1985. The arrangement pitch r of the lenticular lenses 11 of the lenticular lens sheet 10 is 0.33 mm.

By arranging this lenticular lens sheet 10 and a Fresnel lens sheet 20 on the observer 5 side (light-emerging side) and the light-entering side, respectively, a transmission screen 1 was composed. Next, light was projected by an LCD projector 30 so that an image made up of a large number of picture elements 2 with a pixel pitch of 1.32 mm×1.66 mm would be projected onto the lenticular lens sheet 10.

The image projected on the lenticular lens sheet 10 was visually observed, and evaluated according to 5 ranks (A–E: the degree of glaring caused on a projected image becomes high in the order of A to E; A and B are acceptable levels). As a result, the image was observed to be an excellent image free from glaring, and ranked B.

In this case, the size of the maximum diffusing element, that is, the arrangement pitch r of the lenticular lenses 11 is 0.33 mm. Further, when the value of the minor side of the pixel pitch is taken as the pixel pitch P, the pitch ratio r/P is 0.33/1.32=1/4.0.

Furthermore, the size of the minimum diffusing element, that is, the particle diameter d of the glass beads 13 is the mean particle diameter of the glass beads, which is 17 μm≧1.0 μm. Yellowing was not found on the image projected.

EXAMPLE 2

Figure 4:
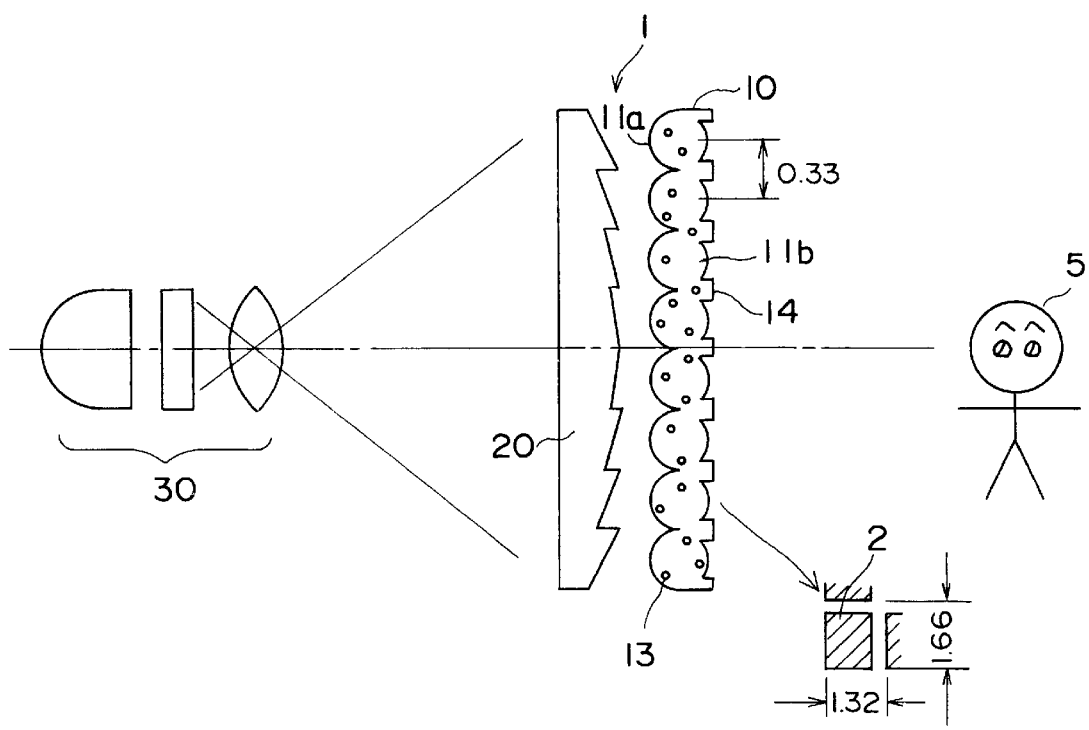
FIG. 4 is a view showing a transmission screen system of Example 2 according to the present invention.

By extrusion-molding polymethyl methacrylate (PMMA) having a refractive index n of 1.51, containing glass beads 13 having a refractive index n of 1.53 and a mean particle diameter of 10 μm, horizontally-diffusive lenticular lenses 11a were provided on the light-entering surface (light-source side) of the molded sheet with an arrangement pitch of 0.33 mm, and, on the light-emerging surface of the molded sheet, light-emerging lenticular lenses 11b were provided on those parts for condensing imaging light, and light-absorbing layers (black stripes: hereinafter referred to as BS) 14 were provided on those parts for passing no imaging light. A double-sided lenticular lens sheet 10 with BS as shown in FIG. 4 was thus prepared.

By arranging this lenticular lens sheet 10 and a Fresnel lens sheet 20 on the observer 5 side and the light-entering side, respectively, a transmission screen 1 was composed. Next, imaging light was projected by an LCD projector 30 so that an image made up of a large number of picture elements 2 with a pixel pitch of 1.32 mm×1.66 mm would be projected onto the lenticular lens sheet 10. The image projected was visually observed; it was observed to be an excellent image free from glaring, and ranked B.

In this case, the size of the maximum diffusing element, that is, the arrangement pitch r of the lenticular lenses 11a, 11b is 0.33 mm. Further, when the value of the minor side of the pixel pitch is taken as the pixel pitch P, the pitch ratio r/P is 0.33/1.32=1/4.0.

Furthermore, the size of the minimum diffusing element, that is, the particle diameter d of the glass beads 13 is the mean particle diameter of the glass beads, which is 10 μm≧1.0 μm. Yellowing was not found on the image projected.

EXAMPLE 3

Figure 5:
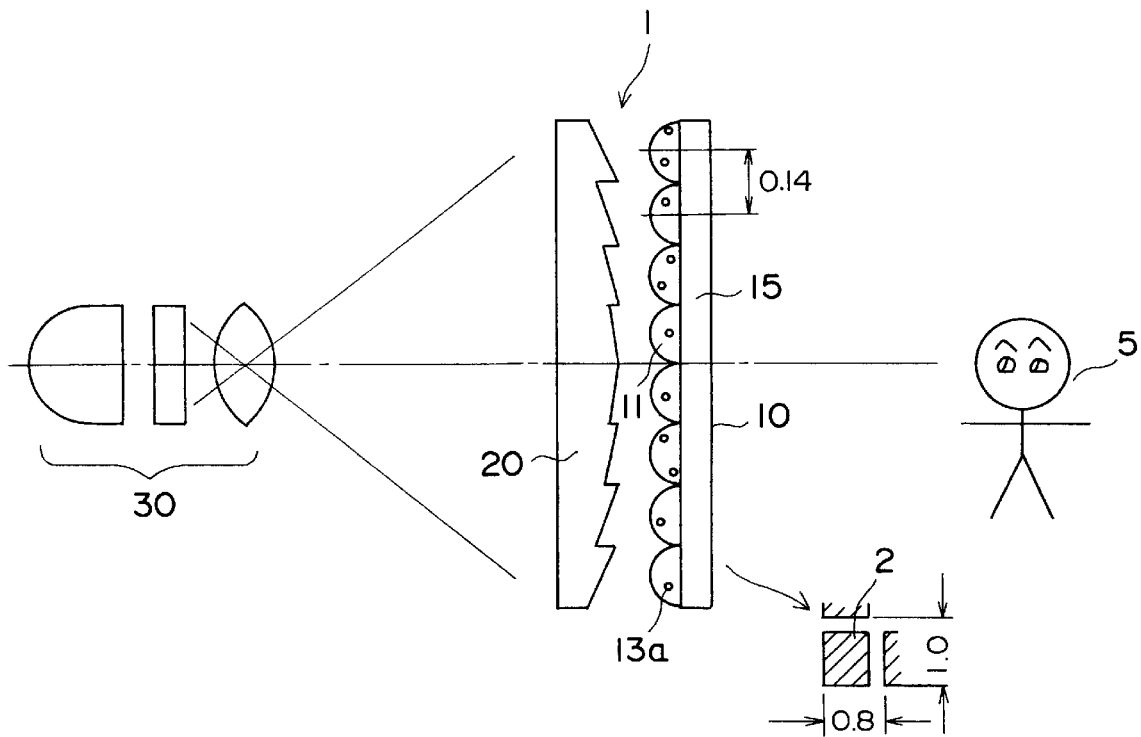
FIG. 5 is a view showing a transmission screen system of Example 3 according to the present invention.

A polyester film 15 was coated with a urethane acrylate ultraviolet-light-curable resin having a refractive index n of 1.49, containing crosslinked polystyrene beads 13a having a refractive index n of 1.59 and a mean particle diameter of 12 μm, and brought into pressure contact with a molding roll on which the inverted shape of lenticular lenses with an arrangement pitch of 0.14 mm had been formed, with the surface coated with the ultraviolet-light-curable resin facing the surface of the molding roll. Ultraviolet light was applied from the non-coated surface side of the film 15 to cure the ultraviolet-light-curable resin, thereby forming lenticular lenses 11 on the light-entering surface of the sheet. The light-emerging surface of the sheet was made flat. Thus, a single-sided lenticular lens sheet 10 as shown in FIG. 5 was obtained.

By arranging this lenticular lens sheet 10 and a Fresnel lens sheet 20 on the observer 5 side and the light-entering side, respectively, a transmission screen 1 was composed. Next, imaging light was projected by an LCD projector 30 so that an image made up of a large number of picture elements 2 with a to pixel pitch of 0.80 mm×1.00 mm would be projected onto the lenticular lens sheet 10. The image projected was visually observed; it was observed to be a very excellent image free from glaring, and ranked A.

In this case, the size of the maximum diffusing element, that is, the arrangement pitch r of the lenticular lenses 11 is 0.14 mm. Further, when the value of the minor side of the pixel pitch is taken as the pixel pitch P, the pitch ratio r/P is 0.14/0.80=1/5.7.

Furthermore, the size of the minimum diffusing element, that is, the particle diameter d of the crosslinked polystyrene beads 13*a* is the mean particle diameter of the crosslinked polystyrene beads 13*a*, which is 12 $\mu$m≧1.0 $\mu$m. Yellowing was not found on the image projected.

EXAMPLE 4

Figure 6:
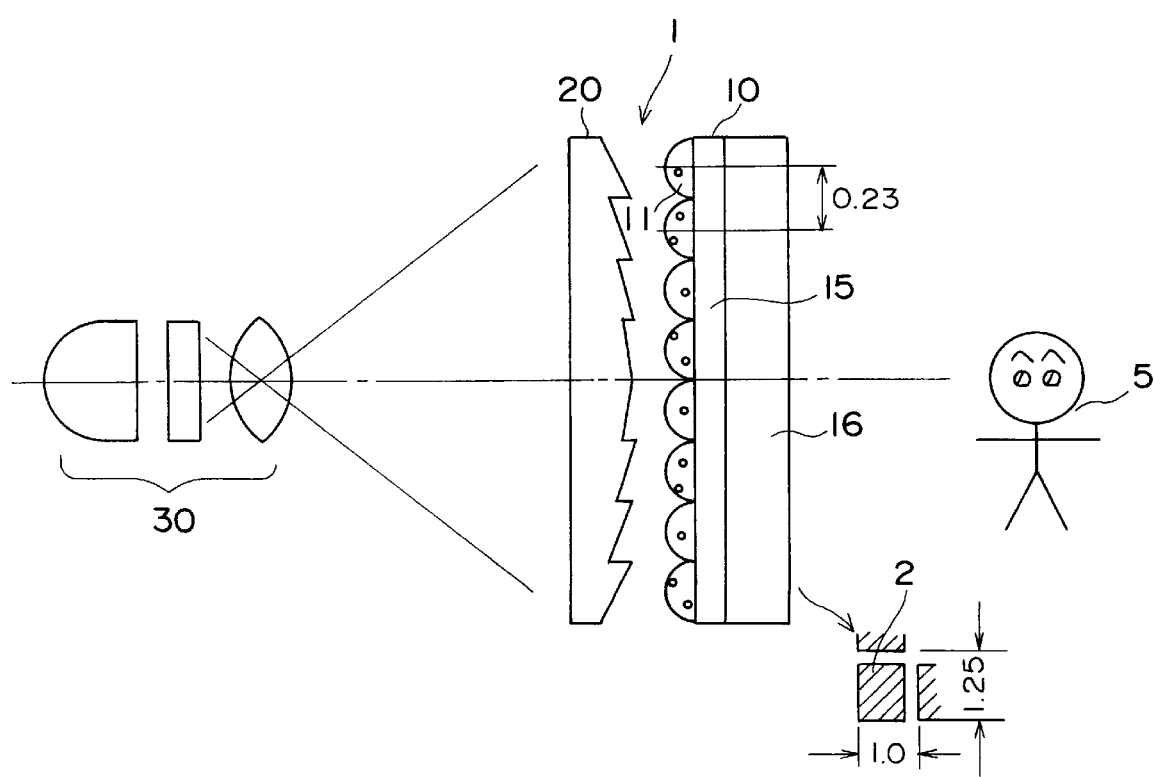
FIG. 6 is a view showing a transmission screen system of Example 4 according to the present invention.

A film 15 having a thickness of 0.36 mm and lenticular lenses 11 were made in the same manner as in Example 3, provided that the arrangement pitch of the lenticular lenses 11 was made 0.23 mm as shown in FIG. 6.

PMMA was extrusion-molded into a rigid sheet 16 having a thickness of 0.6 mm, and the film 15 and the lenticular lenses 11 were laminated to this sheet 16 to obtain a lenticular lens sheet 10.

By arranging this lenticular lens sheet 10 and a Fresnel lens sheet 20 on the observer 5 side and the light-entering side, respectively, a transmission screen was composed. An image made up of a large number of picture elements 2 with a pixel pitch of 1.00 mm×1.25 mm was projected on the lenticular lens sheet 10 by using an LCD projector 30. The image projected was visually observed; it was observed to be an excellent image free from glaring, and ranked B.

In this case, the size of the maximum diffusing element, that is, the arrangement pitch r of the lenticular lenses 11 is 0.23 mm. Further, when the value of the minor side of the pixel pitch is taken as the pixel pitch P, the pitch ratio r/P is 0.23/1.00=1/4.3.

Furthermore, the size of the minimum diffusing element, that is, the particle diameter d of the crosslinked polystyrene beads 13*a* is the mean particle diameter of the crosslinked polystyrene beads 13*a*, which is 12 $\mu$m≧1.0 $\mu$m. Yellowing was not found on the image projected.

EXAMPLE 5

Figure 7:
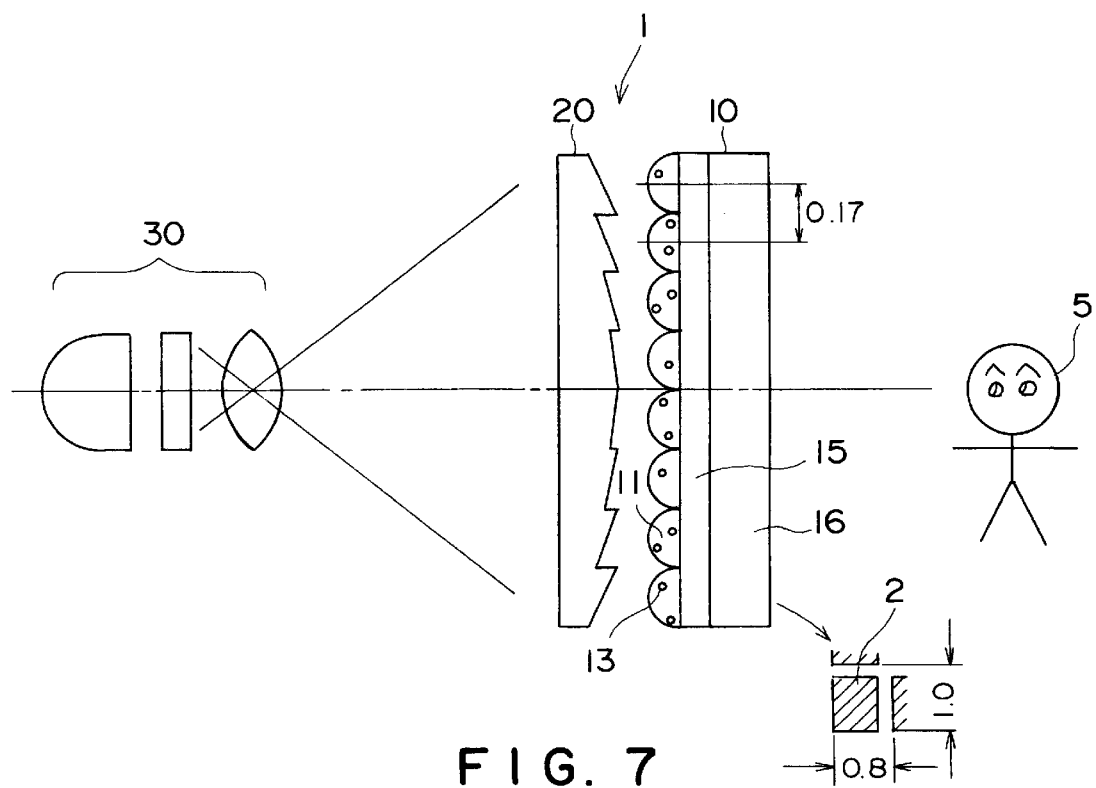
FIG. 7 is a view showing a transmission screen system of Example 5 according to the present invention.

A polyester film 15 was coated with a urethane acrylate ultraviolet-light-curable resin having a refractive index n of 1.49, containing glass beads 13 having a refractive index n of 1.53 and a mean particles diameter of 10 $\mu$m, and brought into pressure contact with a molding roll on which the inverted shape of lenticular lenses with a pitch of 0.17 mm had been formed, with the surface coated with the ultraviolet-light-curable resin facing the surface of the molding roll. Ultraviolet light was applied from the non-coated surface side of the film 15 to cure the ultraviolet-light-curable resin, thereby forming lenticular lenses 11 on the light-entering surface of the sheet. The film 15 with the lenticular lenses 11 having a thickness of 0.36 mm, the light-emerging surface of the film 15 being flat, was thus prepared as shown in FIG. 7.

PMMA was extrusion-molded into a rigid sheet 16 having a thickness of 0.6 mm. The lenticular lenses 11 and the film 15 were laminated to this sheet 16 to obtain a lenticular lens sheet 10.

By arranging this lenticular lens sheet and a Fresnel lens sheet 20 on the observer 5 side and the light-entering side, respectively, a transmission screen 1 was composed. An image made up of a large number of picture elements with a pixel pitch of 0.80 mm×1.00 mm was projected on the lenticular lens sheet 10 by using an LCD projector 30. The image projected was visually observed; it was observed to be a very excellent image free from glaring, and ranked A.

In this case, the size of the maximum diffusing element, that is, the arrangement pitch r of the lenticular lenses 11 is 0.17 mm. Further, when the value of the minor side of the pixel pitch is taken as the pixel pitch P, the pitch ratio r/P is 0.17/0.80=1/4.7.

Furthermore, the size of the minimum diffusing element, that is, the particle diameter d of the glass beads 13 is the mean particle diameter of the glass beads 13, which is 10 $\mu$m≧1.0 $\mu$m. Yellowing was not found on the image projected.

EXAMPLE 6

Figure 8:
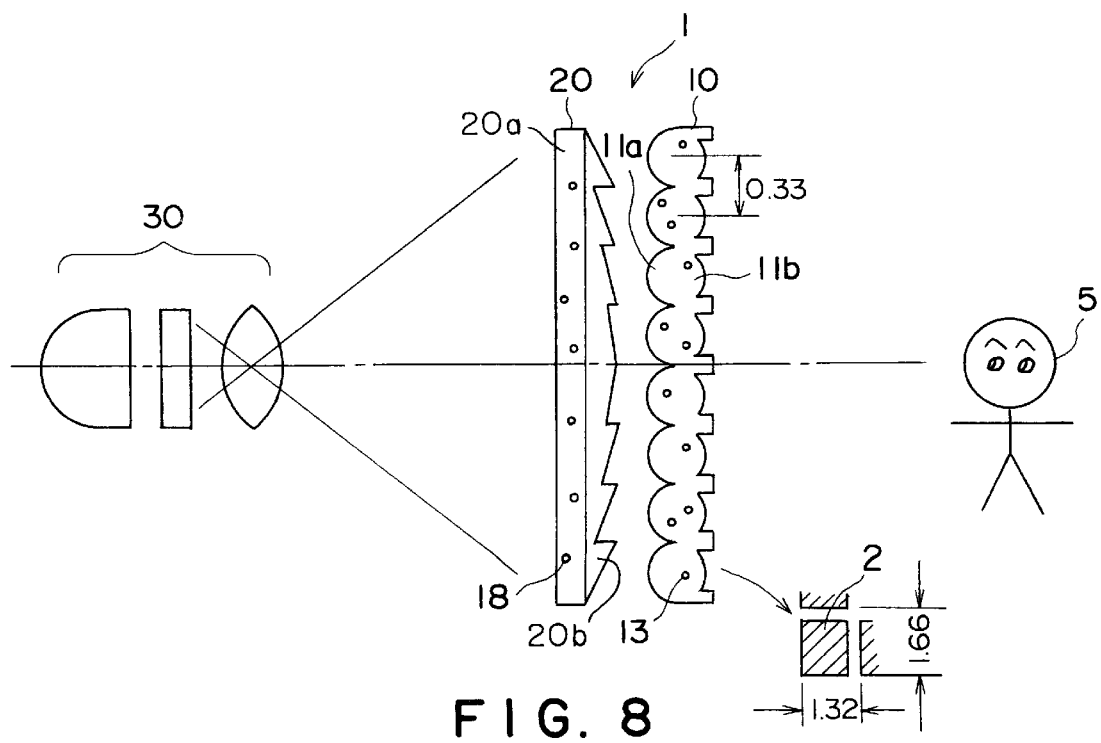
FIG. 8 is a view showing a transmission screen system of Example 6 according to the present invention.

By extrusion-molding PMMA having a refractive index n of 1.51, containing glass beads 13 having a refractive index n of 1.53 and a mean particle diameter of 10 $\mu$m, horizontally-diffusive lenticular lenses 11*a* were formed on the light-entering surface of the molded sheet with an arrangement pitch of 0.33 mm, and, on the light-emerging surface of the molded sheet, light-emerging lenticular lenses 11*b* were provided on those parts for condensing imaging light, and BS 14 was formed on those parts for passing no imaging light. A double-sided lenticular lens sheet 10 with BS as shown in FIG. 8 was thus produced.

PMMA having a refractive index n of 1.51, containing 2.0 parts by weight of crosslinked polyacrylic beads having a refractive index n of 1.49 and a mean particle diameter of 30 $\mu$m was extrusion-molded into a polyacrylic sheet 20*a*. A urethane acrylate ultraviolet-light-curable resin was coated onto a metal mold on which the inverted shape of a Fresnel lens had been formed. On this was placed the above-described acrylic sheet 20*a*, and ultraviolet light was applied with applying pressure to them by a nip roll, thereby curing the ultraviolet-light-curable resin. Thus, a Fresnel lens sheet 20 in which a Fresnel lens part 20*b* had been formed on the acrylic sheet 20*a* was obtained.

By arranging the above-described lenticular lens sheet 10 and Fresnel lens sheet 20 on the observer 5 side and the light-entering side, respectively, a transmission screen 1 was composed. An image made up of a large number of picture elements 2 with a pixel pitch of 1.32 mm×1.66 mm was projected on the lenticular lens sheet 10 by using an LCD projector 30. The image projected was visually observed; it was observed to be an excellent image free from glaring, and ranked B.

In this case, the size of the maximum diffusing element, that is, the arrangement pitch r of the lenticular lenses 11*a*, 11$b$ is 0.33 mm. Further, when the value of the minor side of the pixel pitch is taken as the pixel pitch P, the pitch ratio r/P is 0.33/1.32=1/4.0.

Furthermore, the size of the minimum diffusing element, that is, the particle diameter d of the glass beads 13 is the mean particle diameter of the glass beads, which is 10 $\mu m \geq 1.0$ $\mu m$. Yellowing was not found on the image projected.

Comparative Example 1

Comparative Example 1 is similar to Example 2 shown in FIG. 4. By extrusion-molding PMMA having a refractive index n of 1.51, containing crosslinked polyacrylic beads having a refractive index n of 1.49 and a mean particle diameter of 30 $\mu m$, horizontally-diffusive lenticular lenses 11$a$ were formed on the light-entering surface of the molded sheet with an arrangement pitch of 0.72 mm, and, on the light-emerging surface of the molded sheet, light-emerging lenticular lenses 11$b$ were formed on those parts for condensing imaging light, and BS 14 was formed on those parts for passing no imaging light. A double-sided lenticular lens sheet 10 with BS was thus produced.

By arranging this lenticular lens sheet 10 and a Fresnel lens sheet 20 on the observer 5 side and the light-entering side, respectively, a transmission screen 1 was composed. An image made up of a large number of picture elements 2 with a pixel pitch of 1.08 mm×1.35 mm was projected on the lenticular lens sheet 10 by using an LCD projector 30. The image projected was visually observed; it was observed to be very poor in image quality, and ranked E because the degree of glaring caused on the image was high.

In this case, the size of the maximum diffusing element, that is, the arrangement pitch r of the lenticular lenses 11$a$, 11$b$ is 0.72 mm. Therefore, the ratio of the arrangement pitch to the minor side of the pixel pitch is 0.72/1.08=1/1.5.

The size of the minimum diffusing element, that is, the particle diameter d of the polystyrene beads is the mean particle diameter of the crosslinked polystyrene beads, which is 30 $\mu m \geq 1.0$ $\mu m$. Yellowing was not found on the image projected.

Comparative Example 2

Comparative Example 2 is similar to Example 2 shown in FIG. 4. By extrusion-molding PMMA having a refractive index n of 1.51, containing glass beads having a refractive index n of 1.53 and a mean particle diameter of 10 $\mu m$, horizontally-diffusive lenticular lenses 11$a$ were formed on the light-entering surface of the molded sheet with an arrangement pitch of 0.52 mm, and, on the light-emerging surface of the molded sheet, light-emerging lenticular lenses 11$b$ were formed on those parts for condensing imaging light, and BS 14 was formed on those parts for passing no imaging light. A double-sided lenticular lens sheet 10 with BS was thus produced.

By arranging this lenticular lens sheet 10 and a Fresnel lens sheet 20 on the observer 5 side and the light-entering side, respectively, a transmission screen 1 was composed. An image made up of a large number of picture elements 2 with a pixel pitch of 0.80 mm×1.00 mm was projected on the lenticular lens sheet 10 by using an LCD projector 30. The image projected was visually observed; it was found to be very poor in image quality, and ranked E because the degree of glaring caused on the image was high.

In this case, the size of the maximum diffusing element, that is, the arrangement pitch r of the lenticular lenses 11$a$, 11$b$ is 0.52 mm. Therefore, the ratio of the arrangement pitch to the minor side of the pixel pitch is 0.52/0.80=1/1.5.

The size of the minimum diffusing element, that is, the particle diameter d of the glass beads is the mean particle diameter of the glass beads, which is 10 $\mu m \geq 1.0$ $\mu m$. Yellowing was not found on the image projected.

Comparative Example 3

Comparative Example 3 is similar to Example 3 shown in FIG. 5. By extrusion-molding PMMA having a refractive index n of 1.51, containing crosslinked polyacrylic beads having a refractive index n of 1.49 and a mean particle diameter of 30 $\mu m$, horizontally-diffusive lenticular lenses 11 were formed on the light-entering surface of the molded sheet with an arrangement pitch of 0.40 mm. A single-sided lenticular lens sheet 10 having a flat light-emerging surface was thus produced. By arranging this lenticular lens sheet 10 and a Fresnel lens sheet 20 on the observer 5 side and the light-entering side, respectively, a transmission screen 1 was composed. An image made up of a large number of picture elements 2 with a pixel pitch of 1.00 mm×1.25 mm was projected on the lenticular lens sheet 10 by using an LCD projector 30. The image projected was visually observed; it was found to be poor in image quality, and ranked D because the degree of glaring caused on the image was high.

In this case, the size of the maximum diffusing element, that is, the arrangement pitch r of the lenticular lenses 11 is 0.40 mm. Therefore, the ratio of the arrangement pitch to the minor side of the pixel pitch is 0.40/1.00=1/2.5.

The size of the minimum diffusing element, that is, the particle diameter d of the acrylic beads is the mean particle diameter of the crosslinked polyacrylic beads, which is 30 $\mu m \geq 1.0$ $\mu m$. Yellowing due to absorption by the light-diffusive fine particles was not found on the image projected.

Comparative Example 4

Comparative Example 4 is similar to Example 2 shown in FIG. 4. By extrusion-molding PMMA having a refractive index n of 1.49, containing crosslinked polystyrene beads having a refractive index n of 1.59 and a mean particle diameter of 12 $\mu m$, horizontally-diffusive lenticular lenses 11$a$ were formed on the light-entering surface of the molded sheet with an arrangement pitch of 0.36 mm, and, on the light-emerging surface of the molded sheet, light-emerging lenticular lenses 11$b$ were formed on those parts for condensing imaging light, and BS 14 was formed on those parts for passing no imaging light. A double-sided lenticular lens sheet 10 with BS was thus produced.

By arranging this lenticular lens sheet 10 and a Fresnel lens sheet 20 on the observer 5 side and the light-entering side, respectively, a transmission screen 1 was composed. An image made up of a large number of picture elements 2 with a pixel pitch of 1.26 mm×1.58 mm was projected on the lenticular lens sheet 10 by using an LCD projector 30. The image was visually observed; it was ranked C because the degree of glaring caused on the image was relatively high.

In this case, the size of the maximum diffusing element, that is, the arrangement pitch r of the lenticular lenses 11$a$, 11$b$ is 0.36 mm. Therefore, the ratio of the arrangement pitch to the minor side of the pixel pitch is 0.36/1.26=1/3.5.

The size of the minimum diffusing element, that is, the particle diameter d of the crosslinked polystyrene beads is the mean particle diameter of the crosslinked polystyrene beads, which is 12 $\mu m \geq 1.0$ $\mu m$. Yellowing was not found on the image projected.

Comparative Example 5

Comparative Example 5 is similar to Example 2 shown in FIG. 4. By extrusion-molding PMMA having a refractive index n of 1.51, containing glass beads having a refractive index n of 1.53 and a mean particle diameter of 10 μm, horizontally-diffusive lenticular lenses 11a were formed on the light-entering surface of the molded sheet with an arrangement pitch of 0.33 mm, and, on the light-emerging surface of the molded sheet, light-emerging lenticular lenses 11b were formed on those parts for condensing imaging light, and BS 14 was formed on those parts for passing no imaging light. A double-sided lenticular lens sheet 10 with BS was thus produced.

By arranging this lenticular lens sheet 10 and a Fresnel lens sheet 20 on the observer 5 side and the light-entering side, respectively, a transmission screen 1 was composed. An image made up of a large number of picture elements 2 with a pixel pitch of 1.15 mm×1.44 mm was projected on the lenticular lens sheet 10 by using an LCD projector 30. The image was visually observed, and ranked C because the degree of glaring caused on the image was relatively high.

In this case, the size of the maximum diffusing element, that is, the arrangement pitch r of the lenticular lenses 11a, 11b is 0.33 mm. Therefore, the ratio of the arrangement pitch to the minor side of the pixel pitch is 0.33/1.15=1/3.5.

The size of the minimum diffusing element, that is, the particle diameter d of the glass beads is the mean particle diameter of the glass beads, which is 10 μm≧1.0 μm. Yellowing was not found on the image projected.

By arranging this lenticular lens sheet 10 and a Fresnel lens sheet 20 on the observer 5 side and the light-entering side, respectively, a transmission screen 1 was composed. An image made up of a large number of picture elements 2 with a pixel pitch of 1.08 mm ×1.35 mm was projected on the lenticular lens sheet 10 by using an LCD projector 30. The image was visually observed; it was observed to be a very excellent image free from glaring, and ranked A.

In this case, the size of the maximum diffusing element, that is, the arrangement pitch r of the lenticular lenses 11 is 0.14 mm. Therefore, the ratio of the arrangement pitch to the minor side of the pixel pitch is 0.14/1.08=1/7.7.

The size of the minimum diffusing element is the mean particle diameter of the crosslinked polystyrene beads, which is 0.7 μm<1.0 μm. Yellowing was remarkably caused on the image projected, and the image was thus found to be poor in image quality.

Table 1 shows the results of Examples by comparison with the results of Comparative Examples.

TABLE 1

|  | Lenticular | | | | | Fresnel | | | | | | |
| --- | --- | --- | --- | --- | --- | --- | --- | --- | --- | --- | --- | --- |
|  | Pitch | Type | Thickness | Diffusing Agent | Particle Diameter | Diffusing Agent | Particle Diameter | Gain | Pixel Pitch | Pitch Ratio | Scintillation | Yellowing |
| Example 1 | 0.33 | WA | 1.50 | Glass | 17 |  |  | 4.3 | 1.32 × 1.66 | 1/4.0 | B | ○ |
| Example 2 | 0.33 | BS | 0.70 | Glass | 10 |  |  | 4.3 | 1.32 × 1.66 | 1/4.0 | B | ○ |
| Example 3 | 0.14 | Single-Sided | 0.96 | St | 12 |  |  | 4.2 | 0.80 × 1.00 | 1/5.7 | A | ○ |
| Example 4 | 0.23 | Single-Sided | 0.96 | St | 12 |  |  | 4.4 | 1.00 × 1.25 | 1/4.3 | B | ○ |
| Example 5 | 0.17 | Single-Sided | 0.96 | Glass | 10 |  |  | 4.5 | 0.80 × 1.00 | 1/4.7 | A | ○ |
| Example 6 | 0.33 | BS | 0.70 | Glass | 10 | Acrylic | 30 | 4.3 | 1.32 × 1.66 | 1/4.0 | B | ○ |
| Comparative Example 1 | 0.72 | BS | 0.96 | MMA | 30 |  |  | 4.6 | 1.08 × 1.35 | 1/1.5 | E | ○ |
| Comparative Example 2 | 0.52 | BS | 0.75 | Glass | 10 |  |  | 4.5 | 0.80 × 1.00 | 1/1.5 | E | ○ |
| Comparative Example 3 | 0.40 | Single-Sided | 1.00 | MMA | 30 |  |  | 4.3 | 1.00 × 1.25 | 1/2.5 | D | ○ |
| Comparative Example 4 | 0.36 | BS | 0.72 | St | 12 |  |  | 4.4 | 1.26 × 1.58 | 1/3.5 | C | ○ |
| Comparative Example 5 | 0.33 | BS | 0.70 | Glass | 10 |  |  | 4.3 | 1.15 × 1.44 | 1/3.5 | C | ○ |
| Comparative Example 6 | 0.14 | Single-Sided | 0.96 | St | 0.7 |  |  | 4.2 | 1.08 × 1.35 | 1/7.7 | A | x |

\* Diffusing agent: St is styrene; and MMA is acrylic.

Comparative Example 6

Comparative Example 6 is similar to Example 3 shown in FIG. 5. A polyester film 15 was coated with a urethane acrylate ultraviolet-light-curable resin having a refractive index n of 1.49, containing crosslinked styrene beads having a refractive index n of 1.59 and a mean particle diameter of 0.7 μm, and brought into pressure contact with a molding roll on which the inverted shape of lenticular lenses with an arrangement pitch of 0.14 mm had been formed, with the surface coated with the ultraviolet-light-curable resin facing the surface of the molding roll. Ultraviolet light was applied from the non-coated surface side of the film to cure the ultraviolet-light-curable resin, thereby forming lenticular lenses 11 on the light-entering surface of the sheet. Thus, a single-sided lenticular lens sheet 10 having a flat light-emerging surface was produced.

As described in detail hereinbefore, according to the present invention, even when a projector having a light bulb whose light-emerging aperture is small is used, it is possible to produce an image on a transmission screen with effectively preventing the image from glaring, without causing lowering of gain and decrease in resolution.

What is claimed is:

1. A transmission screen system comprising:
    a transmission screen having a variety of diffusing elements, said transmission screen comprising a Fresnel lens sheet provided on the light-entering side of the transmission screen, and a lenticular lens sheet containing a large number of lenticular lenses and a large number of light-diffusive fine particles, provided on the light-exiting side of the transmission screen, and a projector for projecting light on the transmission screen to project thereon an image having a large number of picture elements, wherein
- a maximum diffusing element is any of the lenses on the lenticular lens sheet,
- a minimum diffusing element is the light-diffusive fine particles, and
- when the size of the maximum diffusing element of the transmission screen is an arrangement pitch of the lenticular lenses designated by r, the size of the minimum diffusing element of the transmission screen is a mean particle diameter of the light-diffusive fine particles designated by d, and the picture element pitch on the transmission screen is designated by P, r, d and P fulfilling the following conditions:

$r/P \leq 1/4.0$ and $1 \mu m \leq d$.

2. The transmission screen system according to claim 1, wherein
the lenticular lenses of the lenticular lens sheet are provided on the light-emerging side, a total reflection lens consisting of a pair of total reflection surfaces is provided between the lenticular lenses.

3. The transmission screen system according to claim 1, wherein
the lenticular lenses have light-exiting lenticular lenses provided on the light-emerging side, and horizontally-diffusive lenticular lenses provided on the light-entering side.

4. The transmission screen system according to claim 1, wherein
the lenticular lenses of the lenticular lens sheet are provided on the light-entering side, and a film is provided on the lenticular lenses on the light-emerging side thereof.

5. The transmission screen system according to claim 4, wherein
a substrate is further provided on the light-emerging side of the film on the lenticular lenses.

6. The transmission screen system according to claim 1, wherein
the light-diffusive fine particles are glass beads.

7. The transmission screen system according to claim 1, wherein
the Fresnel lens sheet has a large number of light-diffusive fine particles, the minimum diffusing element is the light-diffusive fine particles, and the size of the minimum diffusing element is the mean particle diameter of the light-diffusive fine particles.

8. The transmission screen system according to claim 7, wherein
the light-diffusive fine particles are organic polymer beads.

* * * * *